Jan. 15, 1929.
H. P. HUE
1,699,068
ASH REMOVER FOR VEHICLES
Filed Sept. 27, 1927
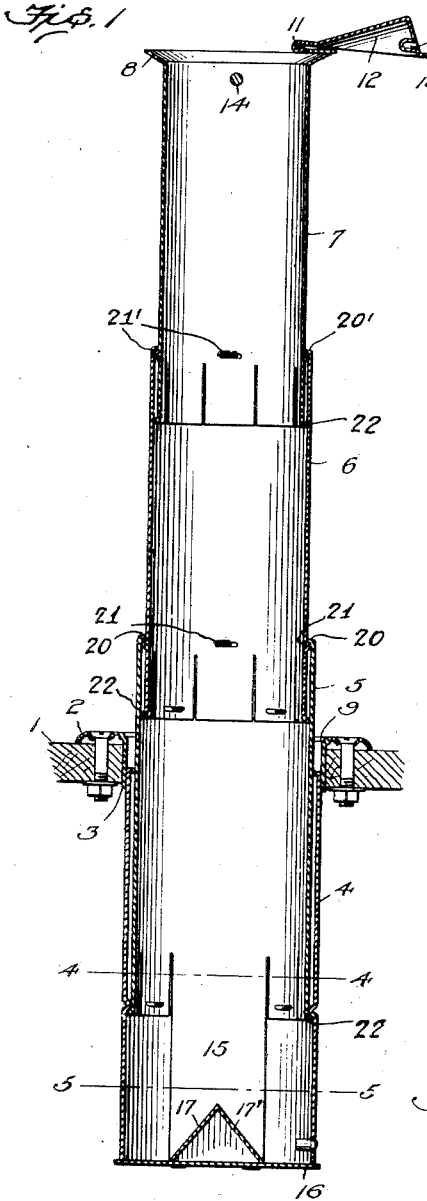
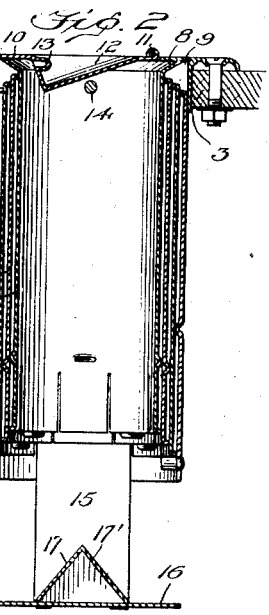
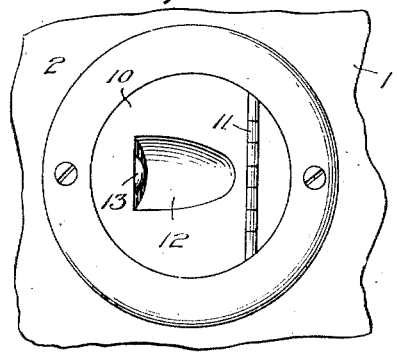
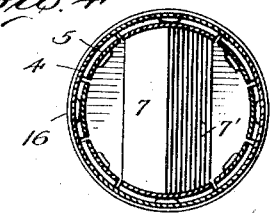
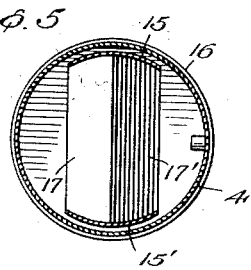
Inventor
H. P. Hue
By Adrian D. Iyer
his Attorney Patented Jan. 15, 1929.

1,699,068

UNITED STATES PATENT OFFICE.

HAROLD P. HUE, OF WARREN, PENNSYLVANIA.

ASH REMOVER FOR VEHICLES.

Application filed September 27, 1927. Serial No. 222,270.

This invention relates to an accessory to be installed in the seating compartment of an automobile, and has for its object the providing of means through which may be discharged cigar and cigarette ashes and other residue of partially smoked cigars and cigarettes by the driver or occupant of an automobile who has been engaged in smoking.

The disposal of cigar ashes, cigarette stumps, and the like when riding in an automobile has heretofore presented difficulties, especially with the closed type of automobile.

The usual custom of drivers of automobiles who smoke while driving is to fleck the ashes off of a cigar or cigarette over the side of the compartment of a car, or out of the open window of a closed vehicle. When this is done, especially while the car is in motion, it frequently happens that the ashes, etc., are deflected back into the car, much to the annoyance of the occupants thereof.

The object of this invention is to obviate this annoyance by providing a novel means by which the ashes, etc., are discharged at a point underneath the body of the car.

To that end my invention consists of a plurality of telescoping tubes adapted to be positioned below the floor of the car when not in use, and adapted to be extended so as to position the receiving orifice therein at a convenient height to be reached by the occupant of the car.

Other advantages of the construction herein shown will be apparent to those skilled in the art.

In the drawings forming a part of this application:

Fig. 1, is a sectional elevation showing the device positioned in the floor of an automobile and extended in operative position.

Fig. 2, is a sectional elevation showing the device in a closed position.

Fig. 3, is a plan view with parts broken away.

Fig. 4, is a view taken on the line 4—4 shown in Fig. 1.

Fig. 5, is a view taken on the line 5—5 shown in Fig. 1.

In the drawings wherein I have illustrated the preferred embodiment of my invention, 1 indicates the floor section of an automobile apertured to receive the floor plate 2, comprising a vertically positioned annular flange 3, through which the telescoping tubes are adapted to be extended.

Located in a fixed position within the annular flange 3 is the depending tube 4, which extends a suitable distance below the floor 1.

Positioned within the fixed tube 4 is a slidable tube 5. Positioned within the slidable tube 5 is the slidable tube 6. Positioned within the slidable tube 6 is the slidable tube 7. The tubes 5, 6 and 7 are adapted to telescope within the tube 4 to a position where their upper ends are below the plane of the floor plate 2.

Positioned on the upper end of the tube 7 is the extended rim 8, the periphery of which forms a closure with the edge of the annular opening 9 in the floor plate 2.

Positioned on top of the extended rim 8 of the tube 7 is the cover member 10. The cover member 10 is formed in two sections connected by the hinge 11.

To provide means for lifting the hinged portion of the cover member 10, there is provided the depression 12, with the finger engaging ledge 13.

For the purpose of providing a means to elevate the tubes 5, 6 and 7 into extended position, there is positioned in the upper end of the tube 7 the pull rod 14, by which the tube 7 may be pulled into extended position.

The movable tubular members 5, 6 and 7 are limited in their sliding movement on one another by a suitable stopping means. This stopping means comprises an inwardly turned flange 20 and 20' on the upper ends of the tubular members 5 and 6 and outwardly extended projecting lugs 21 and 21', formed in the side walls of the tubular members 6 and 7, adapted to form an arresting contact with the inwardly turned flanges of the outer encircling tube.

The upwardly sliding movement of the tubular member 5 is arrested by the contact of the bottom flange 16 with the periphery of the lower end of the fixed tubular member 4.

For the purpose of maintaining the tubular members 5, 6 and 7 in extended position above the floor plate 2, there is provided a frictional contact between the contiguous walls of the sliding members 5, 6 and 7. This frictional contact is created by cutting slots in the lower ends of the slidable tube members as shown in Fig. 4 and turning an outwardly extended shoulder 22 on the slotted extensions forming a spring contact with the inner wall of the outer contiguous tube member.

The fixed tubular member 4 is adapted to extend below the floor 1 of the vehicle a substantial distance, and the tubular member 5 is formed at its lower end with an extension adapted to be positioned below the lower end of the fixed tube 4.

This extension comprises the sectional walls 15 and 15' formed integral with the tube 5. Supported by the sectional walls 15 and 15' is the horizontally disposed disk member 16, having an area sufficient to close the aperture in the lower end of the fixed tubular member 4.

Positioned upon the disk member 16 and extending between the sectional walls 15 and 15' are the inverted V-shaped inclines 17 and 17', the purposes of which will be hereafter more fully explained.

*Operation.*—Assuming that it is desired to place my device in operative position, the cover member 10 is lifted and a hand-hold is applied to the upper tubular member 7 by the cross rod 14, and the tubular members 5, 6 and 7 are placed in extended position with the disk member 16, forming a closure with the lower end of the tubular member 4.

With the apparatus in this position, ashes and cigarette stubs may be deposited therein while the vehicle is in motion, without the danger of a draft of air causing the refuse to be ejected back into the vehicle. This is prevented by the closing of the aperture in the bottom of the fixed tube 4 by the disk 16, assuming a contiguous relation thereto.

After the refuse has been deposited within the apparatus, the cover member 10 is closed, and the slidable tube 7 is depressed until the extended rim 8 is placed in contiguous relation with the annular opening 9.

The depressing of the slidable tube member 7 carries with it the slidable tube member 5, which spaces apart the disk member 16 from the periphery of the lower end of the fixed tubular member 4, forming a free aperture for a draft of air to pass between the sectional walls 15 and 15', induced by the movement of the vehicle. The inclined surfaces 17 and 17' are adapted to aid in the removal of the more solid refuse, such as stubs from cigars and cigarettes by their falling on an inclined plane and thereby inducing a rolling movement which will carry them outside of the periphery of the disk 16.

It will be obvious to those skilled in the art that the apparatus shown in my invention may be applied to the discharge of refuse other than the products of smoking and that with the cover member 10 in an open position any sweepings accumulated while cleaning the floor of the vehicle may readily be swept into the funnel mouth and discharged therethrough.

It is to be understood that I do not limit myself to the specific structure shown in the drawings, as other modifications thereof may be made without departing from the spirit of my invention.

What I do claim, and desire to secure by Letters Patent, is:

1. A tobacco residue discharging means adapted to be positioned in the floor of a vehicle, comprising an annular floor mounting, a slidable tube extending from said mounting to a point below the vehicle floor, and closure means fashioned in the bottom of said tube adapted to be actuated by the sliding movement of said tube.

2. A cigar ash depository for vehicles comprising an annular floor mounting, a slidable tube extending from said mounting to a point above the vehicle floor provided with a hinged closure member therein, a second slidable tube concentric with the first mentioned tube adapted to be extended from said mounting to a point below the vehicle floor, and closure means fashioned in the bottom of said tube adapted to be actuated by the sliding movement of said tube.

In testimony whereof I affix my signature.

HAROLD P. HUE.